(12) United States Patent
Behbehani

(10) Patent No.: US 7,600,877 B2
(45) Date of Patent: Oct. 13, 2009

(54) ALIGNMENT DEVICE FOR AUTOMOTIVE SIDE VIEW MIRROR

(76) Inventor: Iraj Behbehani, 19625 Vineyard La., Saratoga, CA (US) 95070

( * ) Notice: Subject to any disclaimer, the term of this patent is extended or adjusted under 35 U.S.C. 154(b) by 509 days.

(21) Appl. No.: 11/224,842

(22) Filed: Sep. 13, 2005

(65) Prior Publication Data

US 2007/0058276 A1 Mar. 15, 2007

(51) Int. Cl.
*G02B 5/10* (2006.01)
(52) U.S. Cl. .................. 359/868; 359/850; 359/864
(58) Field of Classification Search .................. None
See application file for complete search history.

(56) References Cited

U.S. PATENT DOCUMENTS

| | | | | |
|---|---|---|---|---|
| 3,563,638 A * | 2/1971 | Panozzo | ................. | 359/864 |
| 3,628,851 A * | 12/1971 | Robertson | ................. | 359/868 |
| 3,901,587 A * | 8/1975 | Haile | ................. | 359/868 |
| 4,245,894 A * | 1/1981 | Luchtenberg | ................. | 359/866 |
| 4,264,144 A * | 4/1981 | McCord | ................. | 359/868 |
| 4,331,382 A * | 5/1982 | Graff | ................. | 359/868 |
| 5,096,291 A | 3/1992 | Scott | ................. | 356/237 |
| 5,166,833 A * | 11/1992 | Shyu | ................. | 359/864 |
| 5,793,542 A | 8/1998 | Kondo et al. | ................. | 359/864 |
| 6,076,934 A * | 6/2000 | Gerdes | ................. | 359/871 |
| 6,522,451 B1 * | 2/2003 | Lynam | ................. | 359/265 |
| 2003/0039039 A1 * | 2/2003 | Thomas et al. | ................. | 359/865 |
| 2004/0114260 A1 * | 6/2004 | Bartnick | ................. | 359/864 |

\* cited by examiner

*Primary Examiner*—Joshua L Pritchett
(74) *Attorney, Agent, or Firm*—Schneck & Schneck; Thomas Schneck

(57) ABSTRACT

An alignment system for side view mirrors featuring a mirror with regions of diverse curvature, with an upright alignment line in a region of greater curvature. The side view mirror is set up so that the side of a user's vehicle lies entirely on the side of the alignment line closest to the vehicle. This generates a cone of vision to the rear of the vehicle which overlaps with the cone of vision from a rear view mirror such that blind spots are greatly reduced or eliminated.

1 Claim, 4 Drawing Sheets

Fig. 1
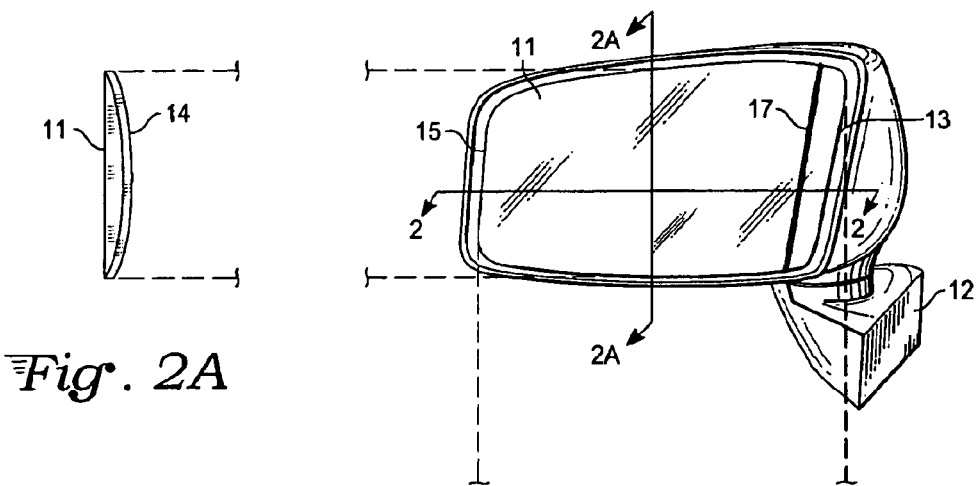
Fig. 2A
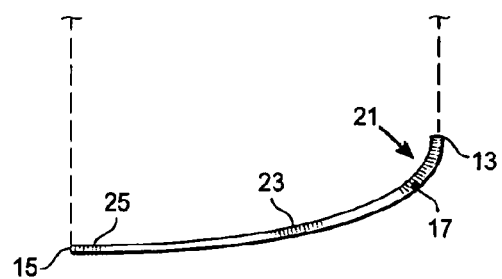
Fig. 2

ALIGNMENT DEVICE FOR AUTOMOTIVE SIDE VIEW MIRROR

TECHNICAL FIELD.

The invention relates to automotive safety devices and, more particularly, to automotive side view mirrors.

BACKGROUND ART

Since the invention of the automobile, there has been concern with the rear view available to a driver by means of mirrors. Various combinations of side view and rear view mirrors have been devised, with particular concern to a blind spot which exists in certain angular sections behind a vehicle. To minimize the blind spot, wide angle side view mirrors have been devised, particularly curved mirrors. It is known that parabolic mirrors, with variable curvature, can be particularly effective in reducing or eliminating blind spots thereby giving a driver a wide angle view of optics behind the vehicle.

Exemplary curved, or curved and planar, side view mirrors can be found in the U.S. Pat. Nos. 4,331,382; 5,793,542; 5,096,291, as well as in published applications 2003/0039039 and 2004/0114260. All of the curved or curved-planar mirrors shown in these patents are useful in eliminating the blind spot. Application 2004/0114260 teaches that a line can be marked on the reflective surface to distinguish between curved and planar regions of a curved-planar mirror.

With curved or partially curved side view mirrors alignment is more critical than with planar mirrors. With curved mirrors, portions of greatest curvature should not be wasted because a large viewing angle is available with these portions. Yet the seating position of a driver can lead to misalignments unless the curved side view mirrors are properly adjusted. An object of the invention was to provide an alignment apparatus for the curved side view mirrors of a vehicle.

SUMMARY OF THE INVENTION

The above object has been met with a mirror alignment system for a driven vehicle featuring curved side view mirrors with an alignment line on a curved portion of each side view mirror. Each mirror has greater curvature toward the side closest to the vehicle and lesser curvature distal to the vehicle, with the alignment line being within one-eighth of an inch to three-quarters of an inch from the inward edge of the mirror closest to the vehicle. In operation, each side view mirror is oriented so that the side of the driven vehicle lies entirely on the side of the alignment line closest to the driver when viewed by the driver. In this manner, the cone of vision from the curved side view mirror will overlap with a cone of vision from the rear view mirror. Both the driver side view mirror and the passenger side view mirror have cones of vision which overlap with the cone of the rear view mirror.

The curved nature of the mirrors allows lateral compression of images, giving a sense of the lateral separation of an approaching vehicle.

BRIEF DESCRIPTION OF THE DRAWINGS

FIG. 1 is a plan view of a driver side curved side view mirror of the present invention.

FIG. 2 is a sectional view of the mirror of FIG. 1 taken along lines 2-2 in FIG. 1.

FIG. 2A is a sectional view of the mirror of FIG. 1 taken along lines 2A-2A in FIG. 1

FIG. 4C is a horizontal cross sectional view of the mirror of FIG. 4B.

FIG. 4D is a vertical cross sectional view of the mirror of FIG. 4B.

PREFERRED EMBODIMENT

Figure 3:
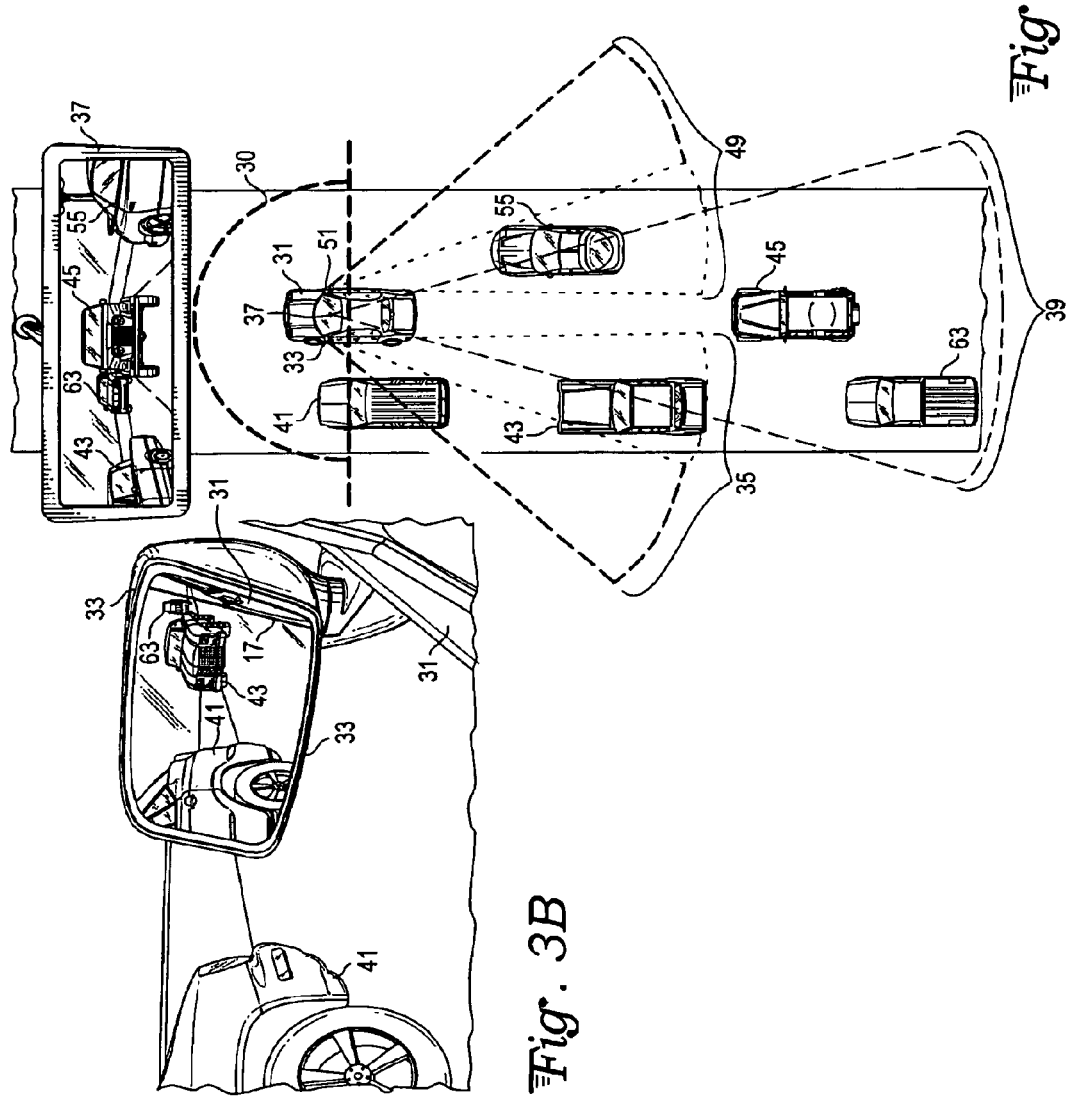
FIG. 3A is a top plan view of a vehicle employing a side view mirror of FIG. 1 on the driver side of a vehicle in traffic using a 3-mirror rear view system in accordance with the invention.
FIG. 3B is a perspective view of a driver side view mirror in the vehicle shown in FIG. 3A.
FIG. 3C is a horizontal cross sectional view of the mirror of FIG. 3B, as in FIG. 2.
FIG. 3D is a vertical cross sectional view of the mirror of FIG. 3B, as in FIG. 2A.

With reference to FIG. 1 a curved mirror 11 is seen which is a vehicular curved side view mirror mounted on the driver's side of an automotive vehicle with bracket 12. While this invention is described with reference to automotive vehicles, the invention could be used with trucks, off-road vehicles and other vehicles, but has greatest applicability for use with vehicles that drive on highways with traffic overtaking the subject vehicle from the sides. A similar mirror of the present invention is mounted on the passenger side of the vehicle with added curvature near the passenger position, as described below with reference to FIG. 4.

The mirror 11 has an inward edge 13 which is closest to the vehicle and an outward edge 15 which is distal to the vehicle. The mirror features a scribe line 17, preferably but not necessarily straight, that is within three-fourths of an inch of the inward edge 13 and preferably within one-fourth of an inch, with a typical placement of the scribe line being one-eighth of an inch from the inward edge of the mirror, but always in the curved portion of the mirror where curvature allows the side of the driver's own vehicle to be seen, as well as nearby objects. The scribe line 17 in the curved portion of the mirror assists in alignment of the mirror relative to the road by making sure that the cone of vision from the mirror incorporates the side of the vehicle, with the cone extending radially outwardly. A vehicle operator should see the side of his own vehicle to the right of scribe line 17 and none of his own vehicle to the left of scribe line 17. The scribe line is on the mirror surface, either above the surface, within the surface, or below the surface, as long as it can be plainly seen by a driver. The mirror is cylindrical, meaning that it has a cross-sectional shape drawn by a line that is upright in the plane perpendicular to the plane of the horizontal cross-section.

FIGS. 2 and 2A illustrate typical cross-sectional shapes. In FIG. 2, inward edge 13 is seen at the extreme right of the drawing, with alignment line 17 represented as a point. Distal edge 15 is at the left edge of the drawing. The horizontal cross-sectional shape is elliptical, with maximum curvature at region 21 and less curvature at region 23, with still less curvature at region 25 where the mirror is almost planar, or reaches planarity. The vertical cross sectional shape is linear. Alternatively, the mirror could have the shape of a portion of a parabola from a region of greater curvature to a region of apparent flatness. A still further alternative is a curved shape, as shown in FIG. 2, but not having any regular geometric shape, except for curvature close to the driver and less curvature further from the driver. The reason that an elliptical shape is preferred is that curvature is smoothly defined over the length of the elliptical segment. The only requirement on the curved mirror is that it has greater curvature in region 21 and very little curvature in region 25. The amount of curvature causes a corresponding amount of lateral, not vertical, compression of objects seen in the mirror. Where curvature is greater such as in region 21, objects, such as cars, are more compressed, allowing more objects that are closer to the side of the driven vehicle to be seen. In FIG. 2A, the upright cross section of mirror 11 is seen to be vertical while the mirror holder 14 has an arbitrary shape.

In FIG. 3A, the driven vehicle 31, with a forward field of vision 30, has a curved driver-side mirror 33 as described in FIG. 2. This mirror has a viewing cone described by fan 35. At the same time, vehicle 31 has a rear view mirror 37 with the viewing cone 39. It will be seen that the viewing cone 35 from the side view mirror 33 and the cone 39 from the rear view mirror 37 have some overlap. Mirror 33 is aligned such that the side of driven vehicle 31 is to the right of the alignment line on the mirror. Vehicle 41 is barely within the viewing cone 35 of mirror 33 as it passes the driven vehicle 31. At the same time, an overtaking vehicle 43 is fully within the viewing cone 35 while a trailing vehicle 45 is in the rear view mirror 37. Passenger side view mirror 51 has a cone of vision 49, allowing vehicle 55 to be seen, as also seen in rear view mirror 37.

FIG. 3B shows the driver side view mirror 33 adjusted with the alignment line 17 having only the driven vehicle 31 to the right of the line. The overtaking vehicle 43 is on the left side of the line 17. The driver side view mirror 33 is seen to have the alignment line 17 within a fraction of an inch of the right edge of the mirror. The left side of the driven vehicle 31 is fully to the right of the alignment line 17. Passing vehicle 43 is seen in the driver side view mirror to the left of the alignment line and a vehicle 63 behind vehicle 43 is also seen in the distance in both in mirror 33 and rear view mirror 37. The rearward portion of passing vehicle 41 is seen in the lefthand portion of mirror 33 as it is barely within the viewing cone of mirror 33.

FIG. 3C shows horizontal cross-sectional curvature of mirror 33, while FIG. 3D shows the vertical cross-section, as in FIG. 2A. The alignment line 17 is seen as a dot with a highly curved region 32 inward of line 17 and a gradually curved region 34 outward of line 17. Curvature is such that the height of vehicles remains the same but the width of vehicles is reduced, perhaps by about one third. Overlap with the rear view mirror allows vehicles to be seen in the side view mirror before leaving the rear view mirror and will be seen in the peripheral vision before leaving the side view mirror.

Figure 4:
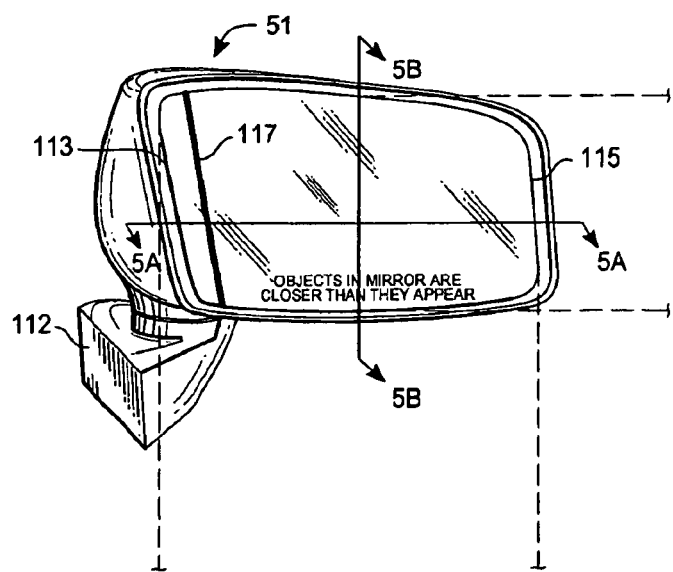
FIG. 4 is a plan view of a passenger side curved side view mirror of the 3-mirror rear view system described in reference to FIG. 3A.

In FIG. 4, the passenger side mirror 51 is mounted to a vehicle using bracket 112. The mirror 51 has an inward edge 113 closest to the vehicle and an outward edge 115, which is distal to the vehicle. The mirror features a scribe line 117, preferably upright and straight, near the inward edge 113. A typical placement of the scribe line is always in the curved portion of the mirror where curvature allows the side of the driver's own vehicle to be seen, as well as nearby objects. The scribe line 117, in the curved portion of the passenger side mirror, assists in alignment of the mirror relative to the road by making sure that the cone of vision from the mirror incorporates the side of the vehicle, with the cone extending radially outwardly. As mentioned previously, a vehicle operator should see the side of his own vehicle to the left of scribe line 117 and none of his own vehicle to the right of scribe line 117.

Figure 5B:
FIG. 5B is a vertical sectional view of the mirror of FIG. 4 taken along lines 5-5, in FIG. 4.
Figure 5A:
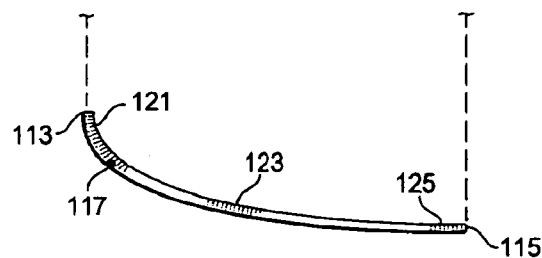
FIG. 5A is a horizontal sectional view of the mirror of FIG. 4 taken along lines 5-5, in FIG. 4.

FIGS. 5A and 5B illustrate typical cross-sectional shapes. Inward edge 113 is seen at the extreme left of FIG. 5A, with alignment line 117 represented as a point in FIG. 5A. Distal edge 115 is at the left edge of the FIG. 5A. The horizontal cross-sectional shape is elliptical as seen in FIG. 5A, with maximum curvature at region 121 and less curvature at region 123, with still less curvature at region 125 where the mirror is almost planar, or reaches planarity. The vertical cross sectional shape seen in FIG. 5B is a portion of a circle so that the shape of mirror 51 has compound curvature, i.e., elliptical in the horizontal plane and curved in the vertical plane.

Figures 4A, 4B:
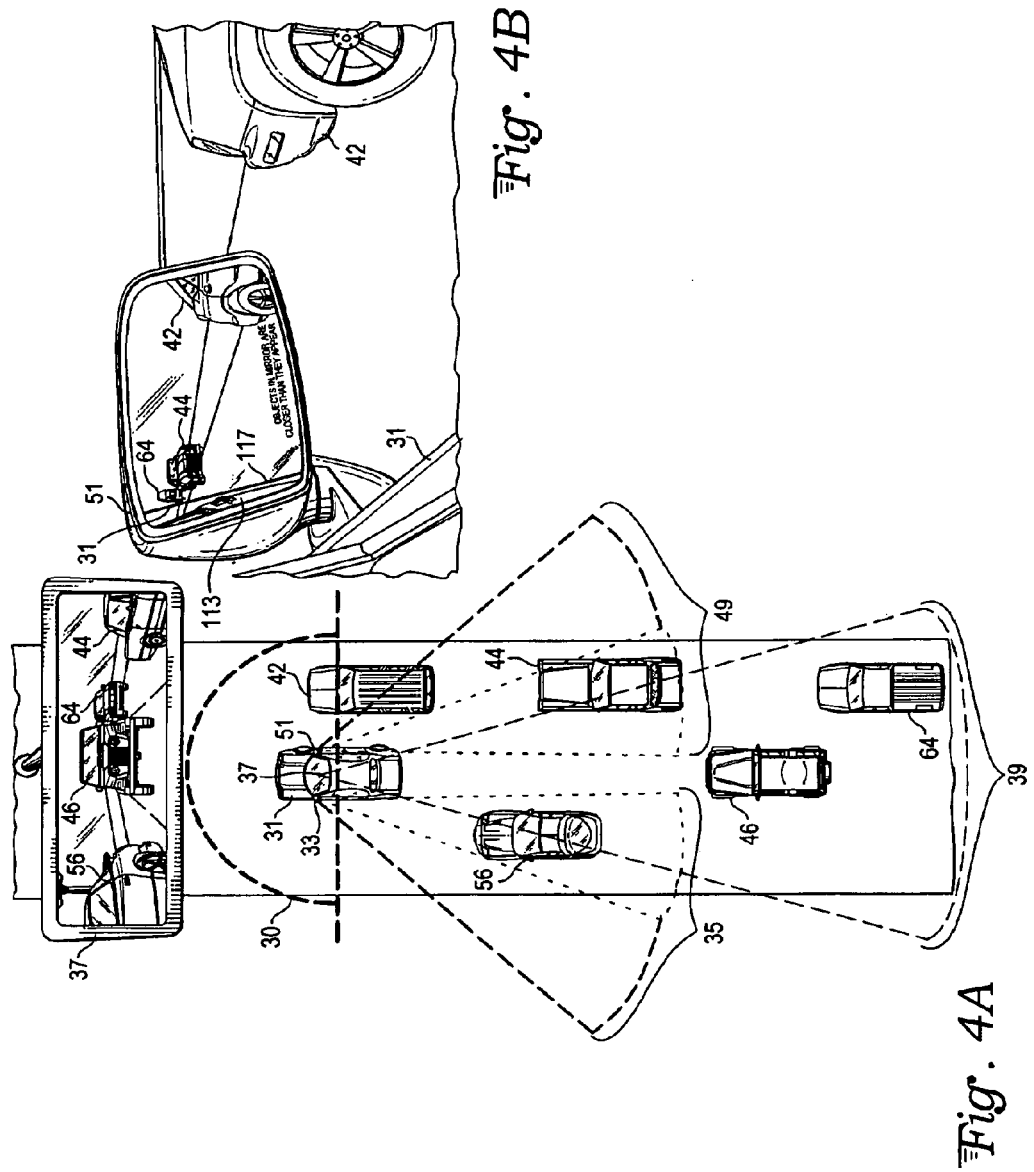
FIG. 4A is a top plan view of the vehicle illustrated in FIG. 3A having a 3-mirror review system and employing a side view mirror on the passenger side in traffic.
FIG. 4B is a perspective view of a passenger side view mirror in the vehicle shown in FIG. 4A.

In FIG. 4A the driven vehicle 31, with a forward field of vision 30, has a curved passenger-side mirror 51 which is similar to mirror 33 described in FIG. 2. The mirror 51 has a viewing cone described by cone 49. The viewing cone 49 from the side view mirror and the cone 39 from the rear view mirror 37 have partial overlap. Mirror 51 is aligned so that the right side of driven vehicle 31 is to the left of the alignment line 117 on the mirror, as shown in FIG. 4B. Returning to FIG. 4A, vehicle 42 is barely within viewing cone 49 of mirror 51 as it passes driven vehicle 31. An overtaking vehicle 44 is fully within viewing cone 49, while a trailing vehicle 46 is in the rear view mirror 37.

In. FIG. 4B, the passenger side view mirror 51 is adjusted with alignment line 117 having only the driven vehicle 31 to the left of line 117. The vehicle 44 is on the right side of line 117. The side view mirror 51 is seen to have alignment line 117 close to the left edge of the mirror, i.e., less than three-quarters of an inch of the left edge. The right side of the driven vehicle 31 is fully to the left of alignment line 117. Passing vehicle 44 is seen in the passenger side view mirror to the right of alignment line 117 and a vehicle 64 behind vehicle 44 is also seen in the distance in both mirror 51 and rear view mirror 37.

In FIG. 4C the portion 113 of mirror 51 closest to the driver is more elliptically curved but blends to a less elliptically curved shape that covers the total surface of mirror. In a perpendicular plane, the mirror is curved in another shape yielding a toric surface. The view of FIG. 4D is the same as FIG. 5B.

In operation, the mirror system of the present invention eliminates blind spots. Moreover, the cylindrical convexity of the driver side view mirror allows vehicles seen in the mirror to have heights that are preserved under Snell's law, i.e., proportional to true heights, but the widths of vehicles are reduced. The same is true for the passenger side view mirror. The combination of elliptical convexity in the horizontal plane, and another convexity in the vertical plane makes the overall size of the vehicles seen in the mirror to appear smaller and farther back. While the height of the vehicles remains smaller and farther back throughout the mirror surface, the width of the vehicles will be reduced as they approach the left side of this mirror closer to the driver.

What is claimed is:

1. In a driver side mirror adjustably mounted on an exterior portion of a motor vehicle having a direction of travel, the mirror of the type having an upright axis perpendicular to the direction of travel of the vehicle, the mirror having the further optical characteristic improvement comprising:

a continuously curved elliptical cross sectional shape for the mirror ranging from highest elliptical curvature extending from a mirror edge closest to the vehicle and smoothly continuously diminishing in elliptical curvature over the entire cross sectional shape all of the way to an edge of the mirror away from the vehicle; and a visible adjustment line on the mirror in the upright direction in the region of highest elliptical curvature defining a driver side view of the mirror and a traffic side view, with the mirror adjustably positioned relative to the vehicle such that the driver side view presents the driver side of the vehicle and the traffic side view presents an optical cone adjacent to the vehicle.

* * * * *